(12) United States Patent
Majumdar

(10) Patent No.: US 7,542,885 B1
(45) Date of Patent: Jun. 2, 2009

(54) METHOD AND APPARATUS FOR PREDICTING UNSTEADY PRESSURE AND FLOW RATE DISTRIBUTION IN A FLUID NETWORK

(75) Inventor: Alok K. Majumdar, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 641 days.

(21) Appl. No.: 11/326,676

(22) Filed: Dec. 22, 2005

Related U.S. Application Data

(63) Continuation-in-part of application No. 10/863,841, filed on Jun. 3, 2004, now abandoned, which is a continuation of application No. 09/313,576, filed on May 7, 1999, now Pat. No. 6,748,349.

(51) Int. Cl.
*G06F 17/50* (2006.01)
*G05B 19/05* (2006.01)

(52) U.S. Cl. .................. 703/2; 703/9; 700/83; 345/744

(58) Field of Classification Search ............... 703/9, 703/2; 700/97, 281, 83; 345/744
See application file for complete search history.

(56) References Cited

U.S. PATENT DOCUMENTS 5,576,965 A * 11/1996 Akasaka et al. ............... 700/97
6,611,736 B1 * 8/2003 Waite et al. .................. 700/281
6,748,349 B1 * 6/2004 Majumdar et al. ............. 703/9
2003/0231205 A1 * 12/2003 Shima et al. ................. 345/744
2007/0168060 A1 * 7/2007 Nixon et al. .................. 700/83

OTHER PUBLICATIONS

Alok Majumdar; "Numerical Modeling of Conjugate Heat Transfer in Fluid Network"; Thermal Fluid Analysis Workshop, Aug. 30, 2004-Sep. 3, 2004, JPL, Pasadena, California.

* cited by examiner

*Primary Examiner*—Thai Phan
(74) *Attorney, Agent, or Firm*—James J. McGroary; Ellis B. Ramirez; Jerry L. Seemann

(57) ABSTRACT

A method and apparatus for analyzing steady state and transient flow in a complex fluid network, modeling phase changes, compressibility, mixture thermodynamics, external body forces such as gravity and centrifugal force and conjugate heat transfer. In some embodiments, a graphical user interface provides for the interactive development of a fluid network simulation having nodes and branches. In some embodiments, mass, energy, and specific conservation equations are solved at the nodes, and momentum conservation equations are solved in the branches. In some embodiments, contained herein are data objects for computing thermodynamic and thermophysical properties for fluids. In some embodiments, the systems of equations describing the fluid network are solved by a hybrid numerical method that is a combination of the Newton-Raphson and successive substitution methods.

23 Claims, 12 Drawing Sheets

METHOD AND APPARATUS FOR PREDICTING UNSTEADY PRESSURE AND FLOW RATE DISTRIBUTION IN A FLUID NETWORK

RELATED APPLICATION

This application is a continuation-in-part (CIP) of U.S. patent application Ser. No. 10/863,841, filed Jun. 6, 2004, now abandoned which is a continuation of U.S. patent application Ser. No. 09/313,576, filed May 7, 1999, now U.S. Pat. No. 6,748,349. This application incorporates each of its parent applications by reference.

ORIGIN OF THE INVENTION

The invention described herein was made by an employee of the United States Government and may be manufactured and used by or for the Government of the United States of America for governmental purposes without the payment of any royalties thereon or therefore.

FIELD OF THE INVENTION

The present invention pertains generally to the field of simulation modeling. More specifically, the present invention relates to methods of representing, accessing, inputting, modifying and monitoring parameters of objects describing fluid transient behavior in a complex pipe network.

BACKGROUND OF THE INVENTION

A fluid flow network consists of a group of flow branches, such as pipes and ducts that are joined together at a number of nodes. A fluid network can range from simple systems consisting of a few nodes and branches to very complex networks containing many flow branches, simulating valves, orifices, bends, pumps and turbines. In the analysis of existing or proposed fluid networks, some node pressures and temperatures are specified or known and are commonly referred to as initial conditions. An example of such a network, where simulation is an important tool, is in determining an accurate prediction of axial thrust in a liquid rocket engine turbopump. Such a network involves the flow of cryogenic fluid through extremely narrow passages, flow between rotating and stationary surfaces, phase changes, mixing of fluids and heat transfer. Propellant feed system designers are often required to analyze pressurization or blow down processes in flow circuits consisting of many series and parallel flow branches containing various pipe fittings and valves using cryogenic fluids. A simulation is used to determine all unknown nodal pressures, temperatures and branch flow rates by accounting for all parameters and conditions.

Available simulation systems are applicable to limited fluid conditions such as for steady-state, single phase incompressible flow. Because of the confidential proprietary nature of computer codes, it is not possible to extend their capability to satisfy other than the above mentioned conditions. Yet another limitation is that simulation code for fluid networks is traditionally for a specific purpose and for specific flow systems, such as to model the Space Shuttle Main Engine (SSME) turbopump. It is difficult to use simulation codes for new designs without making extensive changes in the original code, these changes can prove to be time consuming and inefficient. Therefore, the present Generalized Fluid System Simulation Program (GFSSP) has been developed as a general fluid flow system solver capable of handling phase changes, compressibility, mixture thermodynamics and transient operations, external body forces, such as gravity and centrifugal effects or centrifugal forces, in a complex flow network. The GFSSP simulation model may be constructed using a graphical user interface (GUI) in which various objects are represented by user selected icons or other appropriate graphical representations, and in which the interrelationship between the objects are represented by links.

The oldest simulation method for systematically solving a problem consisting of steady flow in a pipe network is the Hardy Cross method. Hardy Cross, "Analysis of Flow in Networks of Conduits or Conductors", Univ. Ill., Bull. 286, November 1936. Not only is this method suited for solutions generated by hand, but it has also been widely employed for use in computer generated solutions. However, as computers allowed much larger networks to be analyzed, it became apparent that the convergence of the Hardy Cross method might be very slow or even fail to provide a solution in some cases. The main reason for this numerical difficulty is that the Hardy Cross method does not solve the system of equations simultaneously. It considers a portion of the flow network to determine the continuity and momentum errors. The head loss and the flow rates are corrected, and then it proceeds to an adjacent portion of the circuit. This process is continued until the whole circuit is completed. This sequence of operations is repeated until the continuity and momentum errors are minimized. It is evident that the Hardy Cross method belongs in the category of successive substitution methods, and it is therefore likely that it may encounter convergence difficulties for large circuits. In later years, the Newton-Raphson method has been utilized to solve large networks, and with improvements in algorithms based on the Newton-Raphson method, computer storage requirements are not much larger than those needed by the Hardy Cross method. See Jeppson, Ronald W., "Analysis of Flow in Pipe Networks", Ann Arbor Science, 1977.

The flow of fluid in a rocket engine turbopump can be classified into two main categories. The flow through the impeller and turbine blade passages is designated as primary flow. Controlled leakage flow through bearings and seals for the purpose of axial thrust balance, bearing cooling and rotodynamic stability is referred to as secondary flow. Flows in the blade passages are modeled by solving Naiver-Stokes equations of mass, momentum and energy conservation in three dimensions. Naiver-Stokes methods, however, are not particularly suitable for modeling flow distribution in a complex network. Most of the available commercial software packages for solving flow networks are based either on the successive substitution method or on the Newton-Raphson method, and they are only applicable for a single phase incompressible fluid. Crane Company, "Flow of Fluids Through Valves, Fittings and Pipe", Technical Paper No. 410, 1969; Kelix Software System, "Protopipe for Windows, Version 1.0, 1993-95. These are not suitable for modeling rocket engine turbopumps where mixing, phase change and rotational effects are present. Public domain computer programs have been developed in the aerospace industry to analyze the secondary flow in the SSME turbopumps. These programs use real gas properties to compute variable density in the flow passage. However, composite fluids, phase changes and rotational effects have proven difficult to model and simulate using existing software. See, e.g., Anderson, P. G., et al., "Fluid Flow Analysis of the SSME High Pressure Oxidizer Turbopump", Lockheed Report No. LMSC-HREC TR D698083, August 1980.

For the reasons stated above, and for other reasons stated below which will become apparent to those skilled in the art upon reading and understanding the present specification, there is a need in the art for easier way to generate a simulation of a fluid network and for visualizing the fluid network and input/output parameters through graphical representations of the components and simulation result

BRIEF DESCRIPTION OF THE INVENTION

The above-mentioned shortcomings, disadvantages and problems are addressed herein, which will be understood by reading and studying the following specification.

In one aspect of the invention, there is provided a method and system for modeling a fluid network by providing data object representing the fluid network and access to the selected data object for the simulation model. Graphical representations for the components, modeled by data objects, are shown to the user through a diagram panel. A data object attribute panel, different from the diagram panel, is displayed within the user interface for assigning user desired attributes to the data objects. A set of data objects are identified for inclusion into the simulation model through the graphical user interface. In response to the identification of the set of data objects values such as identifiers, characteristics, and initial conditions for each selection of the set of data objects is displayed within the attribute panel. A value for at least one parameter of the set of object parameters is then received via the attribute panel. This value is then assigned to the relevant parameter for the data object resulting in a more accurate representation of the fluid network.

In yet another aspect, a computer accessible medium that when compiled by a processor models a fluid network by providing data object representation of a fluid network and access to selected data object for the simulation model. A diagram panel gives a graphical representation for the components that are represented by data objects. A data object attribute panel, different from the diagram panel, is displayed within the user interface. A set of data objects are identified for inclusion into the simulation model through the graphical user interface. In response to the identification of the set of data objects values such as identifiers, characteristics, and initial conditions for each selection of the set of data objects is displayed within the attribute panel. A value for at least one parameter of the set of object parameters is then received via the attribute panel. This value is then assigned to the relevant parameter for the data object Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

A system level overview of the operation of an embodiment will be described with reference to FIG. 2. In this section, the particular methods performed by the server and clients of such an embodiment are described by reference to flowcharts. Describing the methods by reference to a flowchart enables one skilled in the art to develop such programs, firmware, or hardware, including such instructions to carry out the methods on suitable computerized clients or the processor of the clients executing the instructions from computer-readable media. Similarly, the method performed by the server computer programs, firmware, or hardware are also composed of computer-executable instructions. Method 100 is performed by a client program executing on, or performed by firmware or hardware that is a part of, a computer, such as computer 202 in FIG. 2, and is inclusive of the acts required to be taken by the method in performing fluid network simulation.

Figure 1:
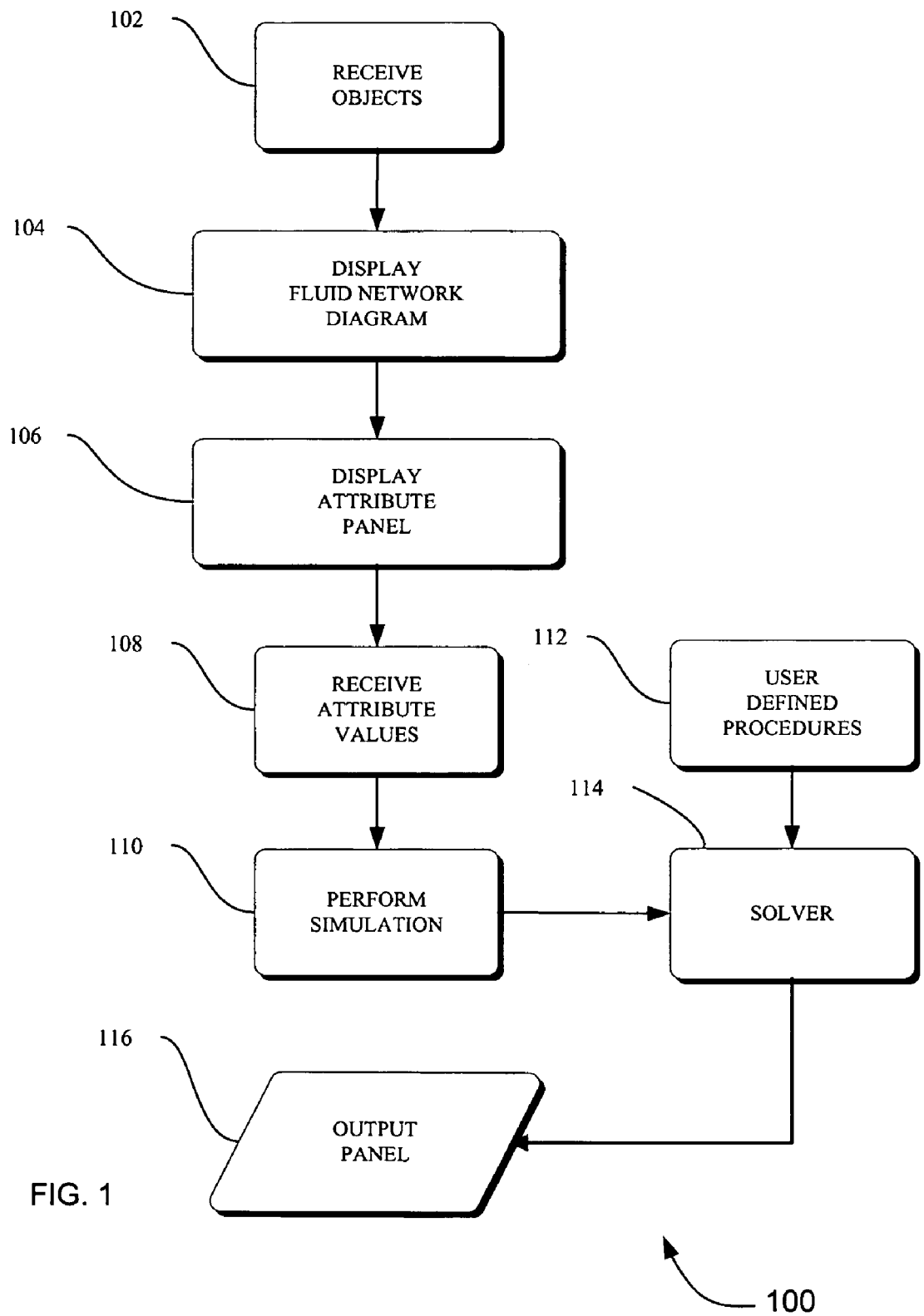
FIG. 1 is a flowchart of a method performed by a client computer according to an embodiment.

FIG. 1 is a flowchart of method 100 performed by a client according to an embodiment. Method 100 solves the need in the art for a more flexible fluid network simulation system.

Method 100 begins by receiving data objects from the user that correspond to one or more components of the fluid network. Fundamentally, an object is a software package that contains a collection of related procedures and data elements. The procedures or methods are a sequence of instructions to a data processing system indicating how a particular task should be carried out. The data elements consist of variables that are a function of initial conditions, time, and the relationship with other objects in the fluid network. The fluid network, when performing a simulation, can be modeled as a discrete series of components. The discretized fluid network is then expressed as a collection of data objects with associated data elements. In fluid network simulation the data objects are boundary nodes, internal nodes, branch node objects, resistance objects such as the ones shown in FIG. 5, fluid heat transfer objects, or data objects defined by the user. In the present arrangement the objects are shown to the user as interactive icons that allow the user to set conditions and responses for the object. Through a graphical user interface (GUI) the user gets to construct a representation of the fluid system by adding and connecting the objects until the desired fluid network has been assembled. As is well known each object may comprise a collection of parameters (also commonly referred to as instances, variables or fields) and a collection of methods that utilize the parameters of the relevant object. The functioning and purposes of each of the various classes of objects shown in FIG. 3 will become apparent from the description that follows. Once the objects have been received control passes to action 104 for further processing.

In action 104, the objects are displayed to the user. A pictorial representation of the fluid network is shown to the user through a diagram panel. The pictorial representation shows the components of the fluid network, the flow path of the fluid, the nodes, the branches, the entry and exit points of the network, and any other object that can show the relationship between data objects showing fluid flow. Once the fluid network has been displayed control passes to action 106 for further processing.

In action 106, an attribute panel is selectively displayed to the user. The attribute panel is shown to the user upon selection of an object for introducing values that reflect initial conditions, properties such as geometric properties and relational properties to other objects, fluid properties, and other user-defined properties. It should be noted that each type of object has its own customized attribute panel as shown in FIGS. 3-6 and reflect system and user generated values for the data object that represents components of the fluid network. Once the user selects the appropriate values for the objects control passes to action 108 for further processing.

In action 108, the attribute values are received. The attribute values are received by the data processing system to simulate the fluid network. The received values can be a built in data type, a number or character, or it can be a reference to another data object. These values can be stored and used by the system at simulation time. If the user chooses to save the model for the fluid network, the values received through the attribute panel are also saved. Once the values have been received for the desired objects control passes to action 110 for further processing.

In action 110, the simulation is performed. The simulation is performed based on the selected objects and attributes. The simulation is accomplished by a solver module 114 that solves a series of mathematical expressions relating to fluid flow, geometrical properties of the fluid system, heat transfer relationships between the fluid and components, the type and composition of the fluid, and thermo dynamic properties and conditions.

The solver module 114 has built in mathematical algorithms and user defined procedures 112 for arriving at a solution. The solver can be used to model phase changes, compressibility, mixture thermodynamics, external body forces, fluid transients, and waterhammer conditions, prediction of unsteady pressure, flowrate distribution, and conjugate heat transfer in a fluid network. The solver's main program and the associated set of data objects or subroutines perform the following functions at simulation time: (1) the generation of a trial solution based on the initial guess, (2) supply time-dependent boundary conditions, (3) Newton-Raphson solution of mass and momentum conservation equations, (4) successive substitution method of solving energy conservation and concentration equations, (5) the calculation of the flow resistance in the branches, (6) prints input/output variables of the problem, (7) quasi-steady flow analysis by deactivating the conservation equations, and (8) unsteady flow analysis or transient response by expressing time dependent terms as a function of density, volume and the values of variables at a lag interval of time. The subroutine INIT generates a trial solution by interacting with thermodynamic property codes GASP and WASP, or the RP-1 property tables. Subroutine BOUND reads any applicable time-dependent boundary conditions from the model history files. Subroutine NEWTON conducts the Newton-Raphson solution of the mass conservation and momentum conservation equations with the help of the subroutines EQNS, COEF, SOLVE and UPDATE. The subroutine EQNS generates the equations. The coefficients of the correction equations are calculated in COEF. The correction equations are solved by the Gaussian Elimination method in SOLVE. After applying the corrections, the variables are updated in subroutine UPDATE. The resistance for each branch is calculated in RESIST following the calculation of fluid densities at each node in the subroutine DENSITY. The flow resistance coefficients ($K_f$) for each branch are computed in subroutines KFACT1 through KFACT18 depending upon the resistance option selected for a particular branch. These subroutines are described in U.S. patent application Ser. No. 09/313,576, filed May 7, 1999, now U.S. Pat. No. 6,748,349, which is herby incorporated by reference.

The thermodynamic property package included in GFSSP consists of two separate programs, GASP and WASP, and it includes tabulated data for RP-1. The GASP and WASP programs consist of a number of subroutines. GASP provides the thermodynamic properties of water. RP-1 properties are provided in the form of tables. Subroutine RP1 searches for the required property values from these tables. The thermodynamic property subroutines are called from two GFSSP subroutines, INIT and DENSITY. In subroutine INIT, enthalpies and densities are computed from given pressures and temperatures at the boundary and internal nodes. In subroutine DENSITY, density, temperatures, specific heats and specific heat ratios are calculated from given pressure and enthalpies at each node. In subroutine KFUSER the user can select resistance options based on the components. The KFUSER module can model a circular and non-circular pipes/ducts, flow through a restriction thick and thin orifice, square expansion and reduction, rotating radial and annular ducts, labyrinth seal, flow between closely spaced parallel plates such as face seals, common fittings and valves, pump characteristics, pump power, joule thompson device, and control valve. In subroutine PRFUSER the user can define new fluid properties. The user in the PRFUSER module can indicate the type of fluid such helium, hydrogen, and water flowing in the network. These programs and subroutines are described in U.S. patent application Ser. No. 09/313,576, filed May 7, 1999, now U.S. Pat. No. 6,748,349, which is herby incorporated by reference.

Figure 2:
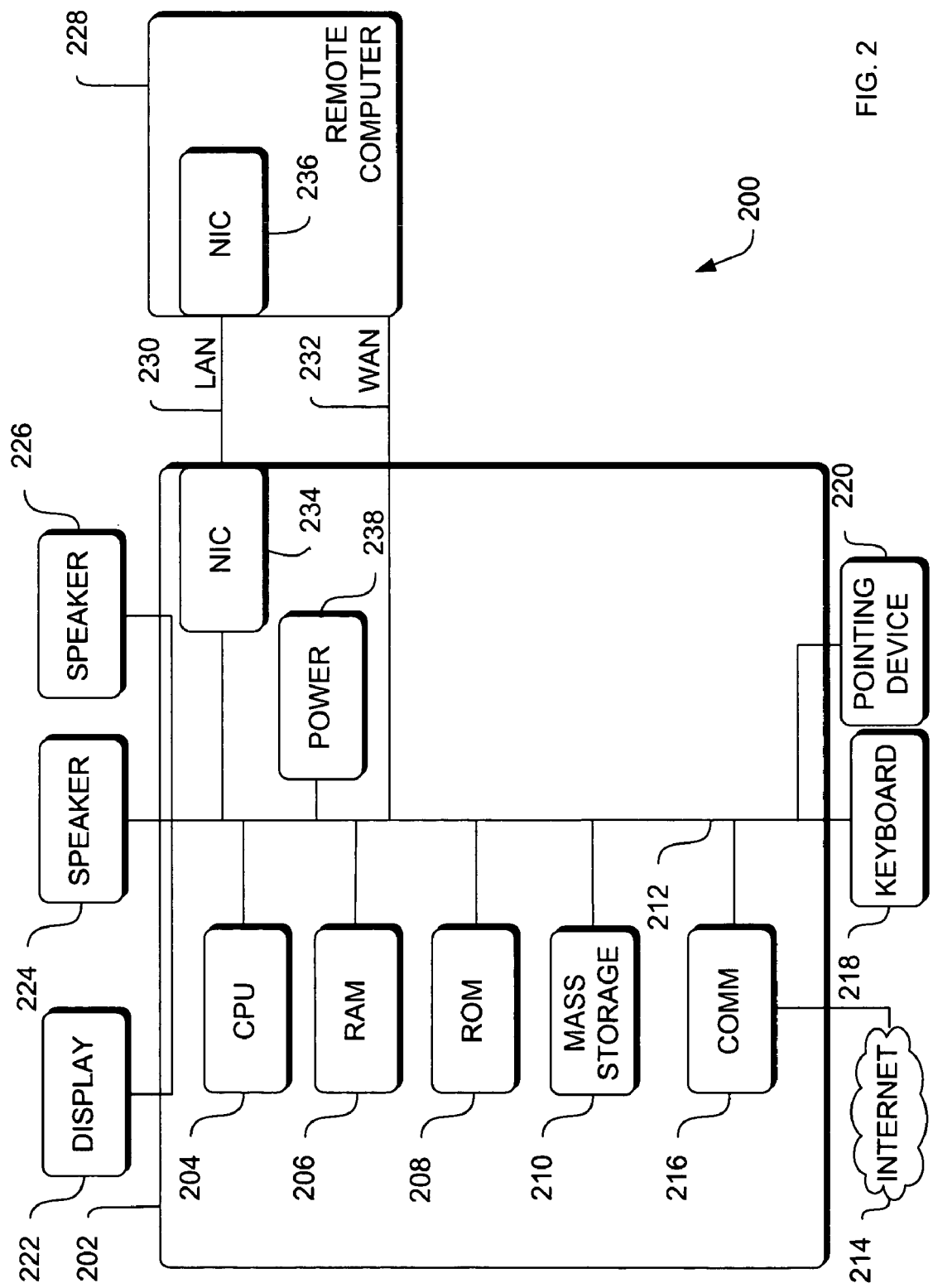
FIG. 2 is a block diagram of the hardware and operating environment in which different embodiments can be practiced.

In some embodiments, method 100 is implemented as a computer data signal embodied in a carrier wave that represents a sequence of instructions which, when executed by a processor, such as processor 204 in FIG. 2, cause the processor to perform the respective method. In other embodiments, method 100 is implemented as a computer-accessible medium having executable instructions capable of directing a processor, such as processor 204 in FIG. 2, to perform the respective method. In varying embodiments, the medium is a magnetic medium, an electronic medium, or an optical medium.

FIG. 2 is a block diagram of the hardware and operating environment 200 in which different embodiments can be practiced. The description of FIG. 2 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 202 includes a processor 204, commercially available from Intel, Motorola, Cyrix and others. Computer 202 also includes random-access memory (RAM) 206, read-only memory (ROM) 208, and one or more mass storage devices 210, and a system bus 212, that operatively couples various system components to the processing unit 204. The memory 206, 208, and mass storage devices, 210, are types of computer-accessible media. Mass storage devices 210 are more specifically types of nonvolatile computer-accessible media and can include one or more hard disk drives, floppy disk drives, optical disk drives, and tape cartridge drives. The processor 204 executes computer programs stored on the computer-accessible media.

Computer 202 can be communicatively connected to the Internet 214 via a communication device 216. Internet 214 connectivity is well known within the art. In one embodiment, a communication device 216 is a modem that responds to communication drivers to connect to the Internet via what is known in the art as a "dial-up connection." In another embodiment, a communication device 216 is an Ethernet® or similar hardware network card connected to a local-area network (LAN) that itself is connected to the Internet via what is known in the art as a "direct connection" (e.g., T1 line, etc.).

A user enters commands and information into the computer 202 through input devices such as a keyboard 218 or a pointing device 220. The keyboard 218 permits entry of textual information into computer 202, as known within the art, and embodiments are not limited to any particular type of keyboard. Pointing device 220 permits the control of the screen pointer provided by a graphical user interface (GUI) of operating systems such as versions of Microsoft Windows®. Embodiments are not limited to any particular pointing device 220. Such pointing devices include mice, touch pads, trackballs, remote controls and point sticks. Other input devices (not shown) can include a microphone, joystick, game pad, satellite dish, scanner, or the like.

In some embodiments, computer 202 is operatively coupled to a display device 222. Display device 222 is connected to the system bus 212. Display device 222 permits the display of information, including computer, video and other information, for viewing by a user of the computer. Embodiments are not limited to any particular display device 222. Such display devices include cathode ray tube (CRT) displays (monitors), as well as flat panel displays such as liquid crystal displays (LCD's). In addition to a monitor, computers typically include other peripheral input/output devices such as printers (not shown). Speakers 224 and 226 provide audio output of signals. Speakers 224 and 226 are also connected to the system bus 212.

Computer 202 also includes an operating system (not shown) that is stored on the computer-accessible media RAM 206, ROM 208, and mass storage device 210, and is and executed by the processor 204. Examples of operating systems include Microsoft Windows®, Apple MacOS®, Linux®, UNIX®. Examples are not limited to any particular operating system, however, and the construction and use of such operating systems are well known within the art.

Embodiments of computer 202 are not limited to any type of computer 202. In varying embodiments, computer 202 comprises a PC-compatible computer, a MacOS®-compatible computer, a Linux®-compatible computer, or a UNIX®-compatible computer. The construction and operation of such computers are well known within the art.

Computer 202 can be operated using at least one operating system to provide a graphical user interface (GUI) including a user-controllable pointer. Computer 202 can have at least one web browser application program executing within at least one operating system, to permit users of computer 202 to access intranet or Internet world-wide-web pages as addressed by Universal Resource Locator (URL) addresses. Examples of browser application programs include Netscape Navigator® and Microsoft Internet Explorer®.

The computer 202 can operate in a networked environment using logical connections to one or more remote computers, such as remote computer 228. These logical connections are achieved by a communication device coupled to, or a part of, the computer 202. Embodiments are not limited to a particular type of communications device. The remote computer 228 can be another computer, a server, a router, a network PC, a client, a peer device or other common network node. The logical connections depicted in FIG. 2 include a local-area network (LAN) 230 and a wide-area network (WAN) 232. Such networking environments are commonplace in offices, enterprise-wide computer networks, intranets and the Internet.

When used in a LAN-networking environment, the computer 202 and remote computer 228 are connected to the local network 230 through network interfaces or adapters 234, which is one type of communications device 216. Remote computer 228 also includes a network device 236. When used in a conventional WAN-networking environment, the computer 202 and remote computer 228 communicate with a WAN 232 through modems (not shown). The modem, which can be internal or external, is connected to the system bus 212. In a networked environment, program modules depicted relative to the computer 202, or portions thereof, can be stored in the remote computer 228.

Computer 202 also includes power supply 238. Each power supply can be a battery.

Figure 3:
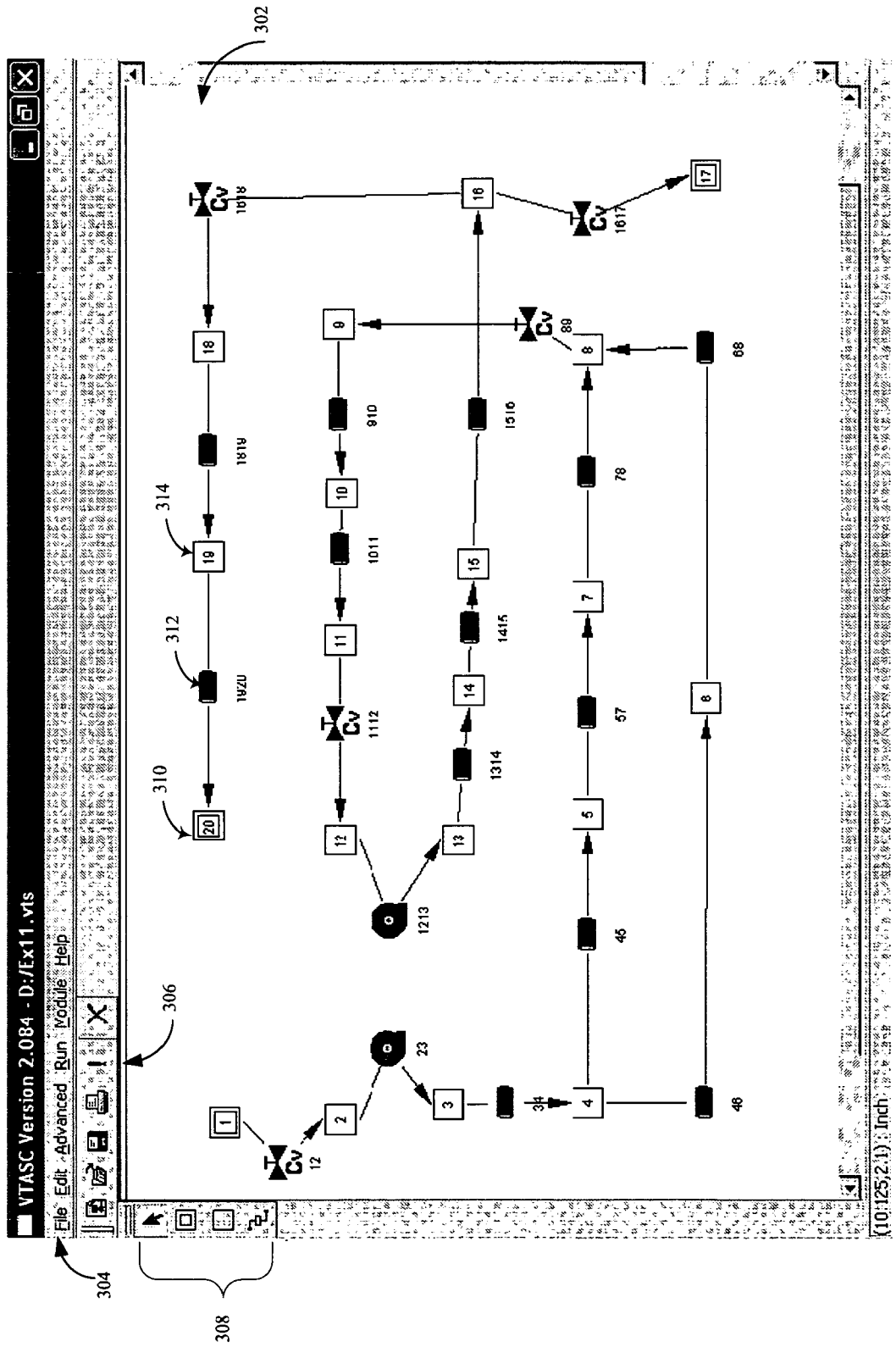
FIG. 3 is a view of the diagram panel and the graphical user interface for use in an implementation.

FIG. 3 is a screen capture illustrating graphical user interface (GUI) 300 depicting a diagram panel for fluid network simulation in accordance to an embodiment. The user begins by selecting data objects that represent components of the fluid network. These components can be selected from data object selection tool bar 306. The diagram panel 302 can be embedded into part of the GUI as shown or it can be a separate panel. In fact, it is also possible to have the diagram panel in a separate computer that is connected to an engine or server through a communication network such as the internet. As shown in the diagram panel all nodes, branches, and components are labeled and represented by an icon for easy reference and for clear documentation of the fluid network and component. For example, see components 310, 312, 314 for a representation of nodes, branches, and components. These components can be encapsulated with initial conditions received from the data processing system and through the attribute panel the user can provide updates or fine-tuning to changing desired conditions. The options for such actions as running the simulation, creating or updating the solver with new modules, and for editing the diagram panel and its content can be selected from the toolbar menu.

Figure 4:
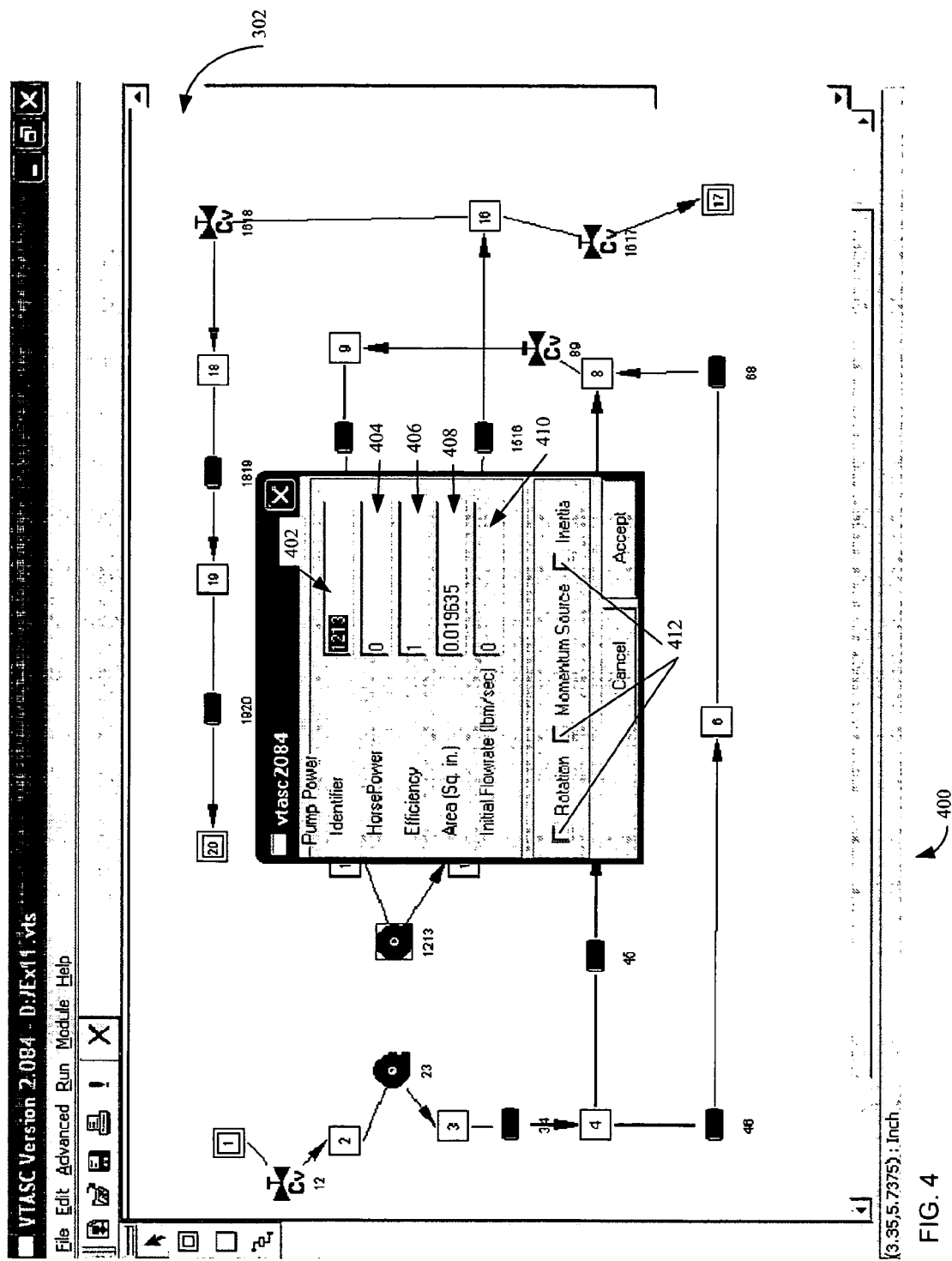
FIG. 4 is a view of the data object attribute panel for a component of the fluid network and the graphical user interface for use in an implementation.

FIG. 4 is a representation of a data object attribute panel. The attribute panel for pump power component has a type identifier (pump power) and a system identifier 1213 as shown in text box 402. The system identifier serves the dual purpose of providing a quick way for the user to verify the label on the attribute panel and the label on the diagram panel and a way for the system to keep track of the simulation process. Further, note that the identifier in the text box coincides with the label on the component as shown in the diagram panel of GUI 300. The data object attribute panel additionally has text boxes 404 and 406 for receiving values that pertain to the items "horse power" and efficiencies. Further, the initial flow rate is set by the system based on the initial conditions for the fluid flow rate and is shown in text box 410. The user can select, through selection box 412, a model that reflects the rotation, the momentum source, and inertia of experienced by the component.

Figure 5:
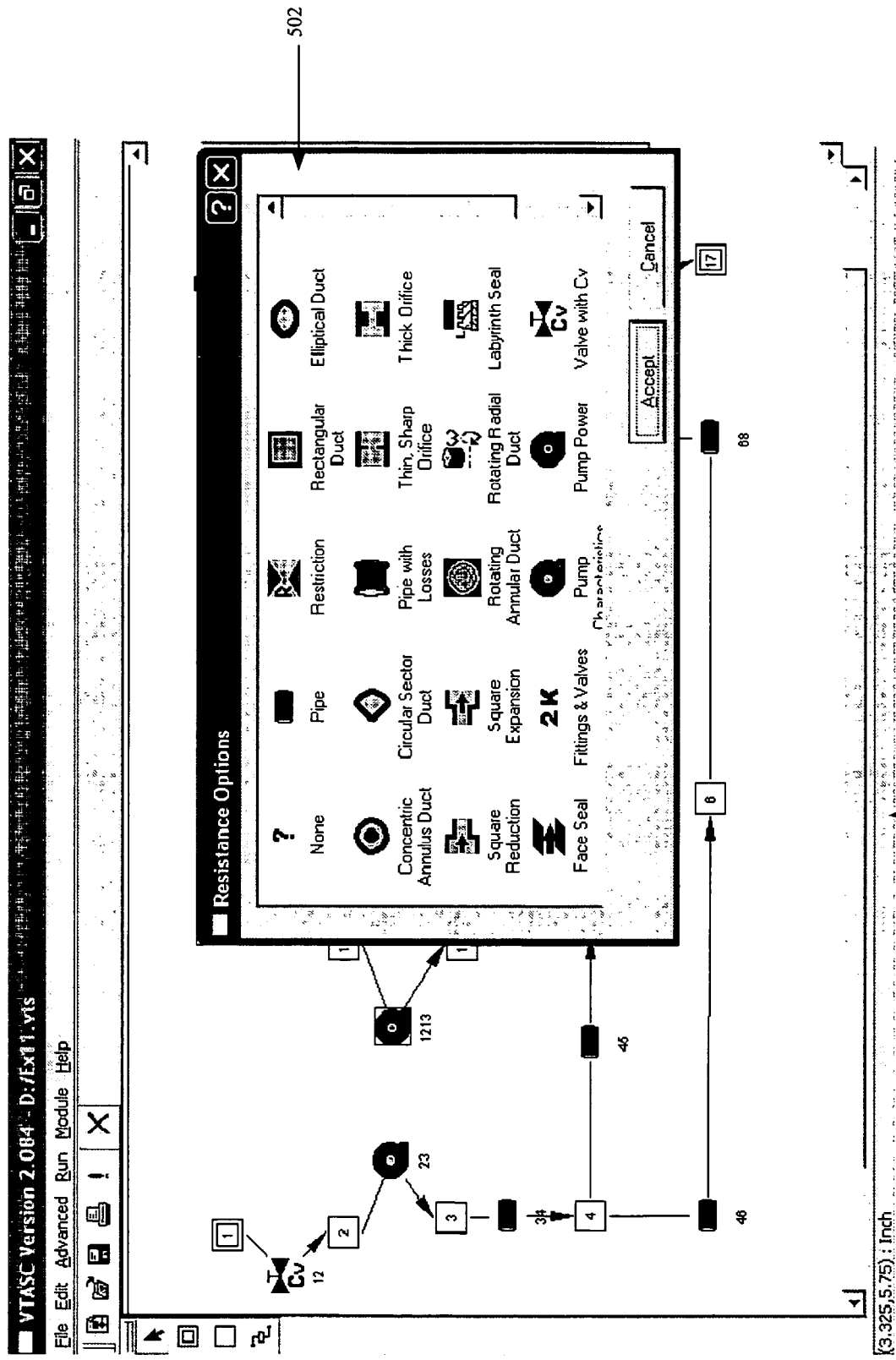
FIG. 5 is a view of the object attribute panel for selecting a resistance option for a component and the graphical user interface for use in an implementation.

FIG. 5 shows a screen shot of the resistance data objects that may be selected by the user to model a fluid network. The choice of resistance options can range from no resistance to seals and ducts as shown in panel 502.

Figure 6:
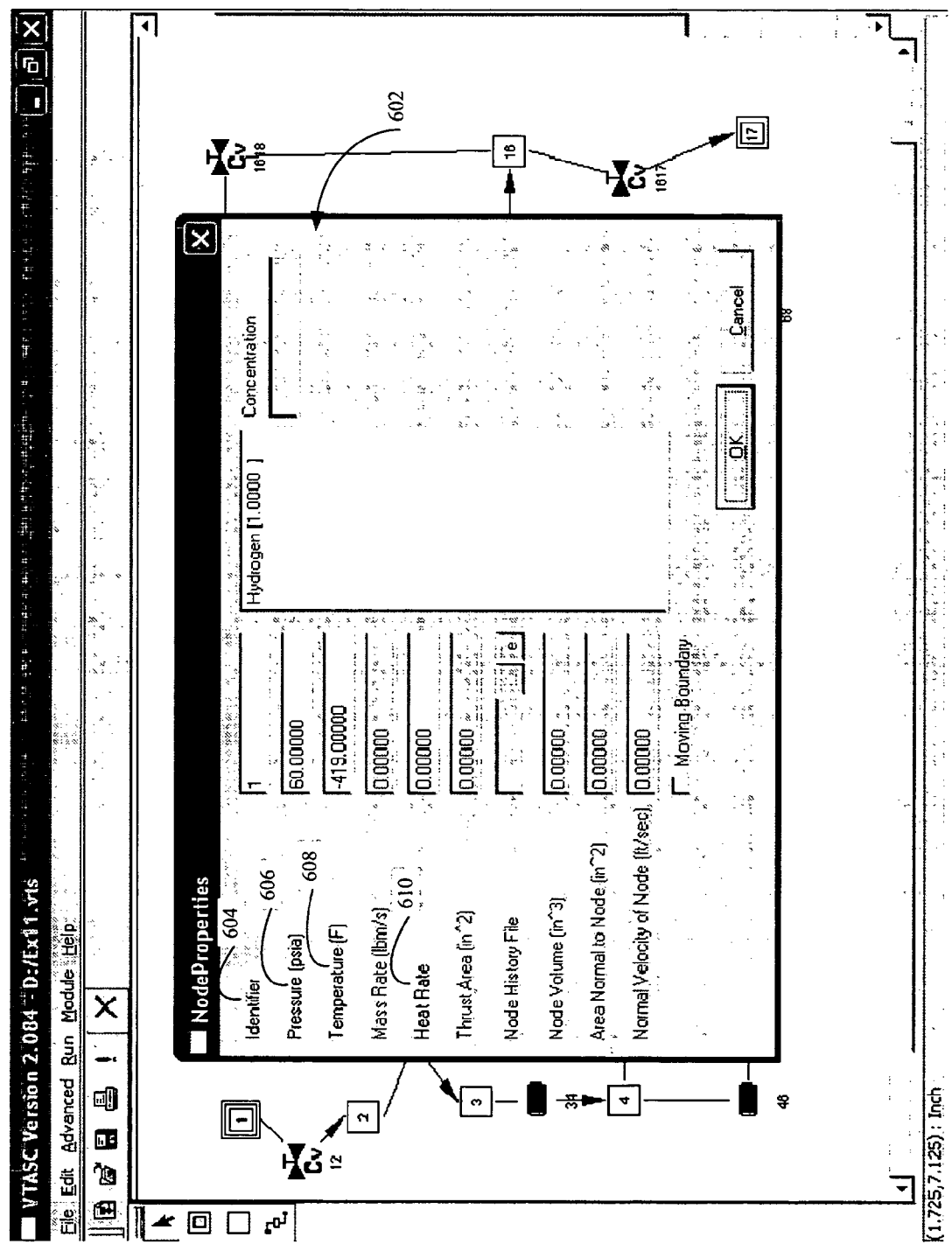
FIG. 6 is a view of the object attribute panel for selecting values for a component and the graphical user interface for use in an implementation.

FIG. 6 is a screen shot of the data object attribute panel 602 for nodal data objects. It should be noted at this point that values entered in this data object attribute panel or any of the other data object attribute panel can be based on values taken directly or indirectly from a fluid network. Thus, these values do not exist in the abstract but in fact are real signals that when analyzed provide an understanding of the inner workings of the fluid network. The purpose of the panel is to provide a tool for accepting inputs for parameters that are changeable by the user and for displaying values (not changeable by the user) that are set by the system in accordance to initial conditions. Example of these parameters are temperature, velocity, volume, compressibility factor, density, viscosity, time step, time, surface roughness of a pipe, emissivity, Stefan-Boltzman Constant, gas constant, Reynolds Number, heat generation rate. The panel shows the node identifier 604, a pressure input box 606 to select the pressure at labeled node 1, a temperature input box 608 for selecting the temperature, and a heat rate input box 610. Other properties are set by the system, which may be selectively displayed but not changeable by the user, based on the initial conditions and the selected fluid network model.

Figure 7:
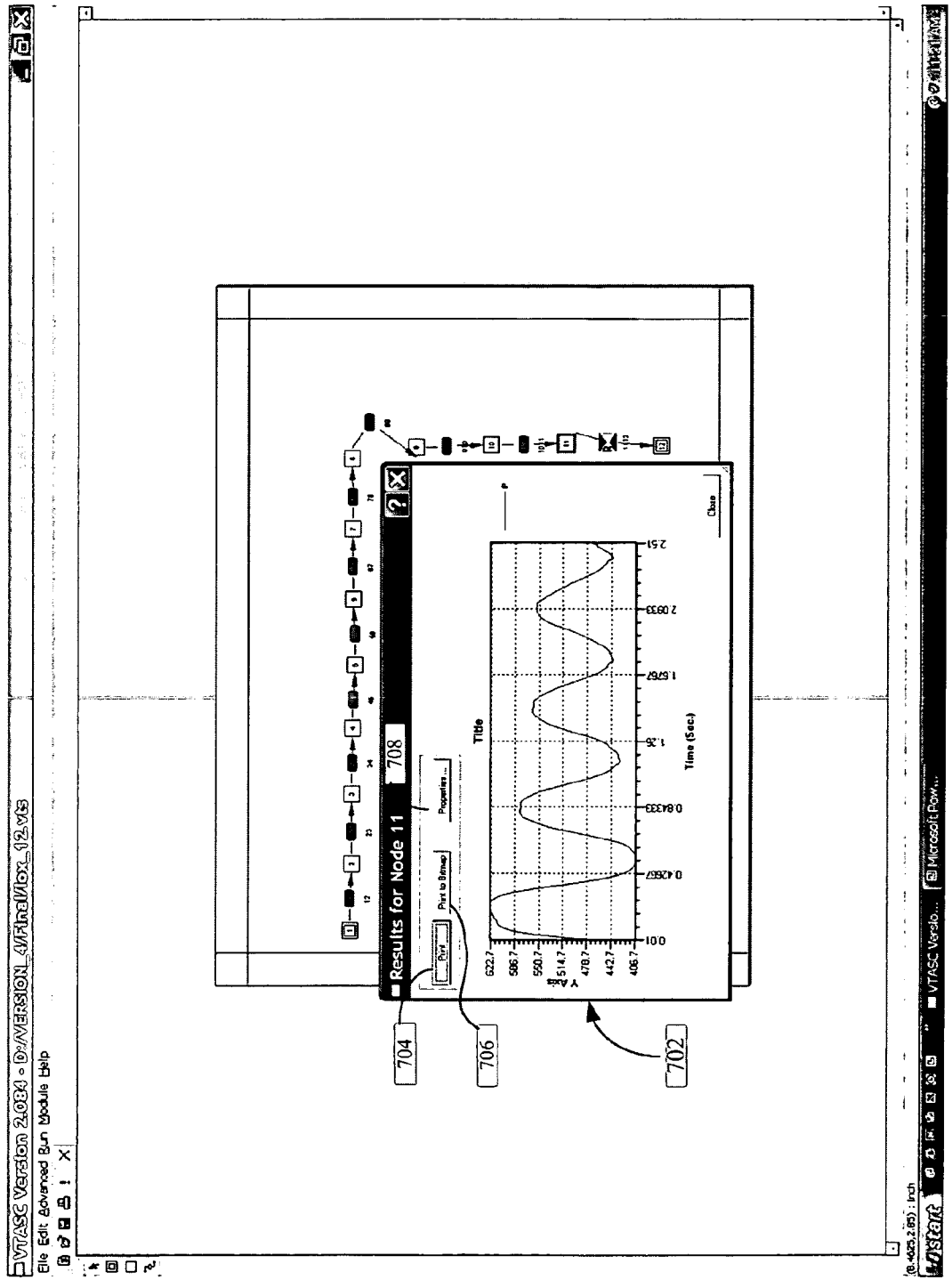
FIG. 7 is a view of one aspect of the output panel and the graphical user interface for use in an implementation.

FIG. 7. is a screen shot of the output panel for the network fluid simulation system 700. In this instance, output panel 702 shows a graphical representation of the output parameter (pressure) as it varies over time. As shown the output panel allows the user the choice of printing the output at 704, creating a bitmap of the output at 706, or to change the properties 708 of the graph to show different scales (amplitude vs. time), or to change the output parameter monitored by the simulation. Other format types of outputs are possible such as text printing the parameters or exporting the output parameters to packages that would prepare the output for printing or graphing.

Figure 8:
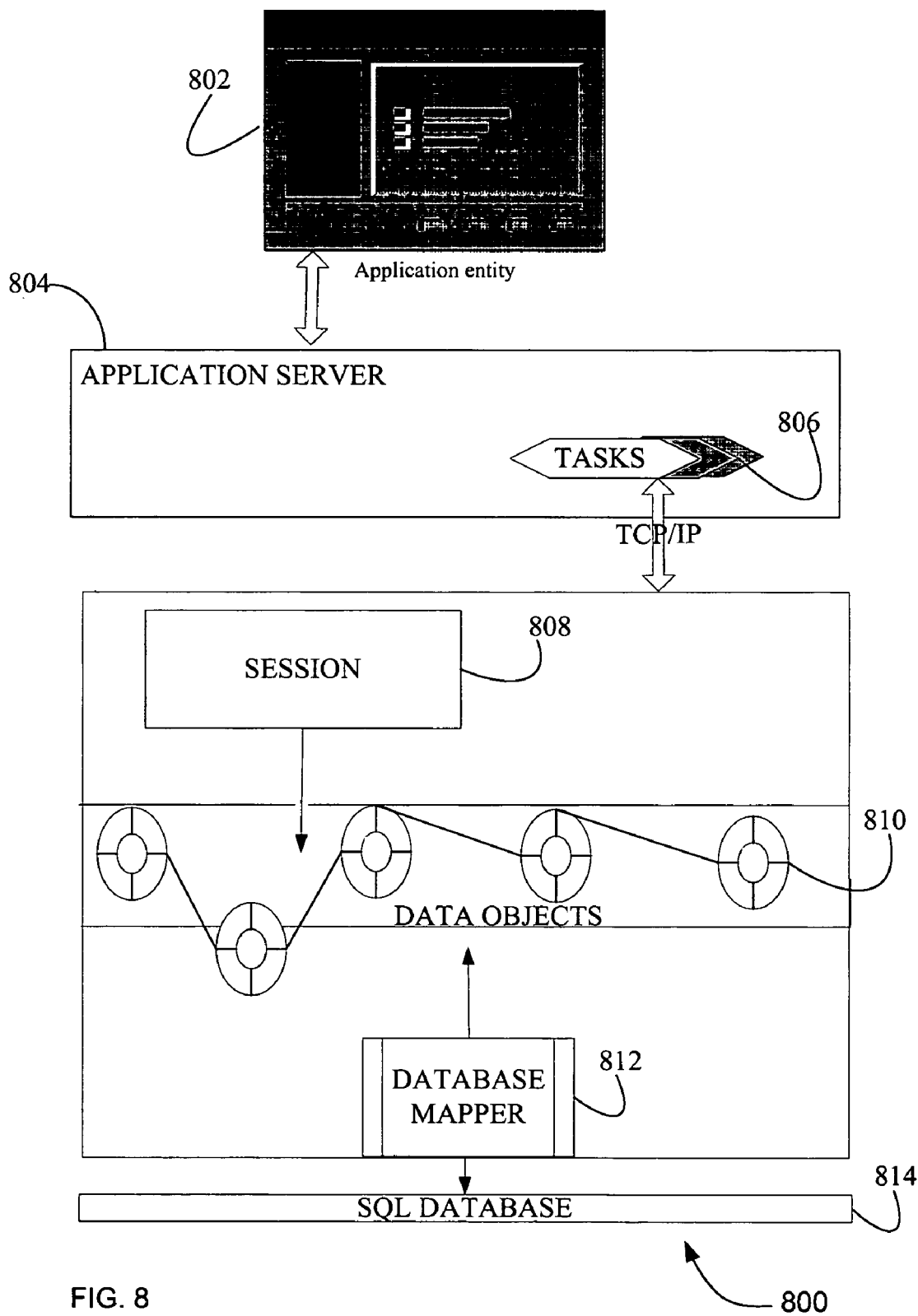
FIG. 8 is a view of a client and data objects for use in an implementation.

FIG. 8 illustrates the various architectural layers that make up the computer simulation system for a fluid network. The top layer represents the level at which a user directly interacts with the simulation system through computer system 200 using a graphical user interface (GUI) 802 while the other layers may be embodied in a single machine powered by an application server (804). The application server 804 is responsible for facilitating a user's ability to access the simulation system through menus and data objects that represent components of a fluid network. In the preferred embodiment, the application server is written in programming language known as C++, Java Applets, FORTRAN, or a combination thereof. Such architecture will accommodate planned new components easily and is highly scalable. The architecture provides for flexible process flows, and utilizes a thin client application that is accessible via the network. Open interface architecture standards facilitate scalability to meet the inclusion of other simulation engines, simulation modules, or simply access from remote locations. Java applications use a servlet to support particular applications. A servlet is a small Java program used to facilitate the performance of a software application on a server. In the preferred embodiment, a servlet will exist to support the software application running on the computer system at 200 with the application constituting a task 806 to be supported.

The tasks 806 in the application server 804 interfaces with an application layer through a graphical user interface (GUI) 802 using a protocol called TCP/IP. TCP/IP means Transmission Control Protocol/Internet Protocol, a protocol suite for communication networks such as the Internet. Each "instance" of the software application running on the computer system at 200 will require an Enterprise Java Bean ("EJB"). An EJB provides software developers with the ability to apply Java technology to the creation of reusable server components for exchanging data objects that simulate a fluid network.

In the application layer, session 808 and data objects 810 contain the logic necessary for performing fluid network simulation at computer system 200. For example, the process of combining node objects (boundary, internal, branch) or any other of the fore mentioned data objects is located in the domain layer. An object-oriented programming language such as C++ is used to build the software that resides on the computer system 200. The application layer of an object-oriented software application will contain both a library of ancestor objects and application objects inheriting characteristics and functionality from the library of objects that collectively is called the data objects 810.

The last section of the application layer in FIG. 8 is a database mapper 812. The database mapper 812 interfaces between the data objects 810 where the logic of a software application exists, and a data layer that houses the commercially available relational database 814 that actually stores data. The Persistent Object Service maps persistent objects to relational database tables and converts persistent object operations to a sequence of structured query language (SQL) statements. The online system advantageously maps each object to one or more relational database tables based on the object's attributes and its relationships with other objects. For inheritance object-to-table mapping, a top level table is created for base attributes, and child tables are created that contain only the extended attributes of inherited objects.

Figure 9:
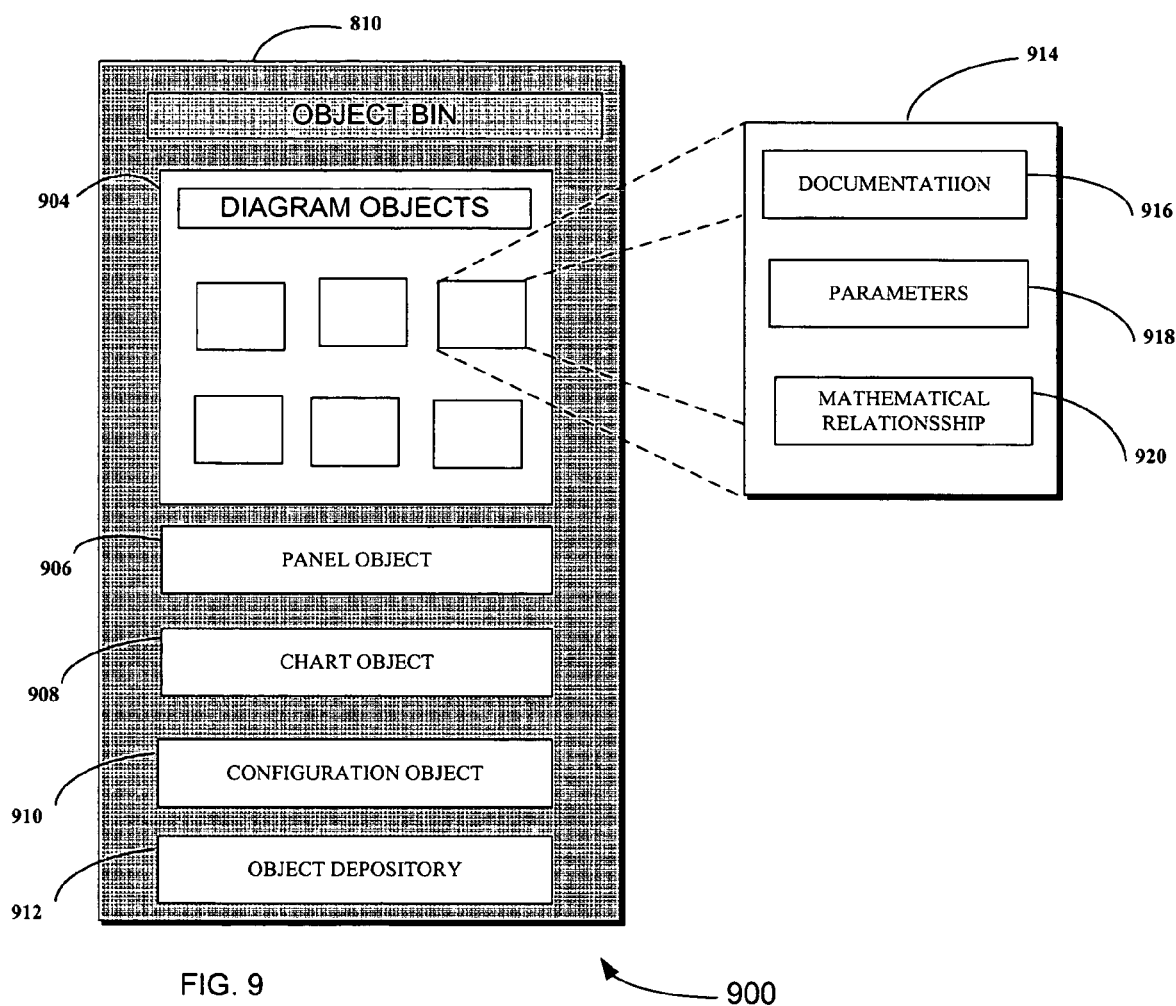
FIG. 9 is a view of a data object bin and amplification of a selected object for use in an implementation.

Referring to FIG. 9, there is provided a diagrammatic representation of one exemplary embodiment of fluid network simulation data objects 810 according to the present invention. Specifically, the data objects comprises an object bin, which may be coded using an object-oriented language such as the C++ or Java programming languages. Accordingly, the object bin is shown to comprise classes of objects, namely diagram objects 904, panel objects 906, chart objects 908, configuration objects 910, and an object depository 912 for storing additional data objects that may be used for simulating a fluid network. It is well known within the data object art, each object within the object bin may comprise a collection of parameters (also commonly referred to as instances, variables or fields) and a collection of methods that utilize the parameters of the relevant data object. The functioning and purposes of each of the various classes of objects shown in FIG. 9 will become apparent from the description that follows. An exploded view 914 of the contents of an exemplary diagram object 904 is provided, from which it can be seen that the diagram object 904 includes documentation 916 which provides a description of the diagram object, a collection of parameters 918, and methods or mathematical relationship 920 which may define an equation, a class, or multiple equations. The diagram objects 904 each define a feature or object of a modeled component of the fluid network system that is displayed within a diagram window by a graphical presented to the user through a programmed interface (GUI) which interacts with the object bin. According to one exemplary embodiment, the diagram objects 904 may include state, function, modifier and link objects that are displayed to the user by state nodes, function nodes, modifier icons and link icons within the diagram window. The other objects shown in the FIG. 9 such as object 906 and object 908 each define respective windows (or panels) which are overlaid when selected on a diagram window to present selected information regarding the modeled fluid network system, and to facilitate user interaction with individual data objects of the fluid network model. A panel as used herein refers to any designated or identified area with a display, regardless of shape, size or demarcation and shall be taken to encompass, but is not so limited to, a window with a GUI.

Figure 10:
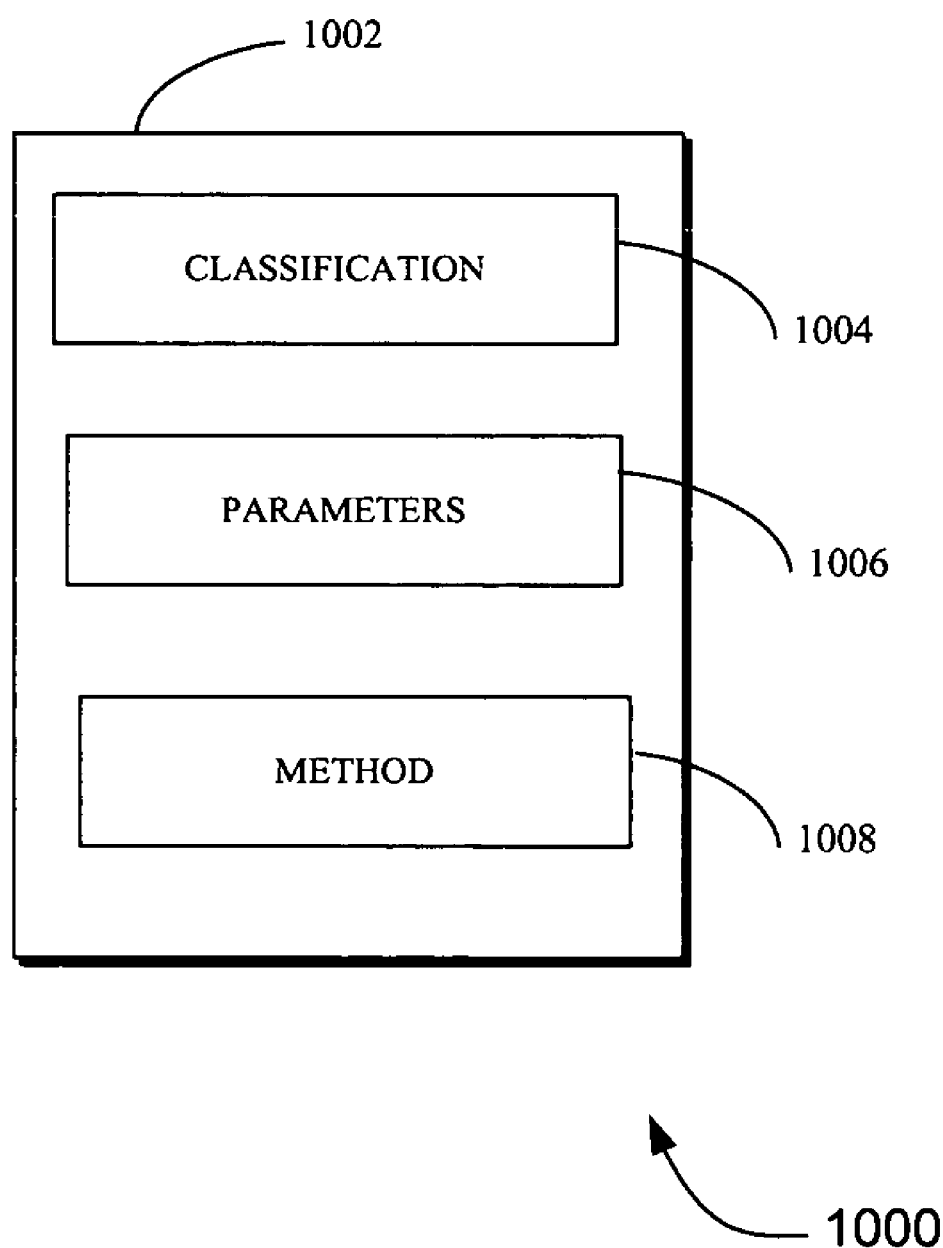
FIG. 10 is a view of a data object for use in an implementation to simulate a fluid network.

Referring now to FIG. 10, there is shown a data object representation of an arbitrary data object of the fluid network simulation. Through the data object attribute panels a user receives information regarding any model element of the fluid network and allows the user to input or specify values attributable to the respective element that makes up the fluid network model. The manner by which a parameter window is invoked and constructed within the GUI was described with reference to FIGS. 3-6. The exemplary data object is shown to include three sections, namely a classification section 1004, a parameter section 1006, a method section 1008. The classification section 1004 displays an identifier or symbol for the data object. The identifier can be a name, name with a function, the equipment type, or any other arbitrary identification that is suitable for classification of data objects. For example, in FIG. 4 when referring to the resistance component "pump power" and catalog number "1213." In the illustrated parameter window 1006, the parameters represent the coefficients of equations within a specific object for representing a node or component of the fluid network. These parameters can have units that represent the pressure, temperature, geometric units such as dimensions and volume, flow rate, and any other designated units that convey a property or aspect of the branches, nodes, and components of a fluid network. The units of the coefficients used by the system are display and in some instances can be changed by the user. The units can be used to visually assessed values that are designated as working values in the settings section of the data object attribute panel. If the internal and assessed units are different, a correction may also be indicated in the attribute panel or a conversion module may be designed by the user.

The method section 1008 represents the logical and mathematical relationship of the data object for an element of the fluid network. These relationships can be found in U.S. patent application Ser. No. 09/313,576, filed May 7, 1999, now U.S. Pat. No. 6,748,349, which is hereby incorporated by reference. In special cases such as when the fluid network experiences transient conditions and when the fluid network experiences conjugate heat transfer the method would require the suspension of certain variables and the solutions of these mathematical relationships by employing variational principles by introducing the additional parameter of a time step. A transient condition arises when the fluid systems experiences either a quasi-steady flow or an unsteady flow through the network. A quasi-steady flow is a type of unsteady flow that occurs when the system goes from one steady-state situation to another steady-state situation. The causes of transient conditions are commonly from changes in valve settings, starting or stopping a pump, changes in power demand, actions of reciprocating pump, changes in elevation of reservoir, waves in reservoir, vibrations in pumps specially at impeller or guide vanes, unstable pump characteristics, or condensation. These sudden changes can cause a waterhammer condition to occur. A waterhammer is an impulse load created by an abrupt change such as valve opening or closing. The resulting pressure loads can have catastrophic effects on pumps, pressure transducers, turbines, and valves. A waterhammer event typically occurs over a short time frame. Various methods can be employed for analysis such as the arithmetic method, the graphical method, the finite difference method, the impedance method, or the finite volume method. Regardless of the method of analyses, during quasi-steady flow the time dependent terms in the conservation equation are not activated. It should be noted that the solution is expected to be time dependent because the boundary condition is time dependent. During unsteady flow the time dependent terms are a function of density, volume and value of variables at a delta of time before the transient condition.

Figure 11:
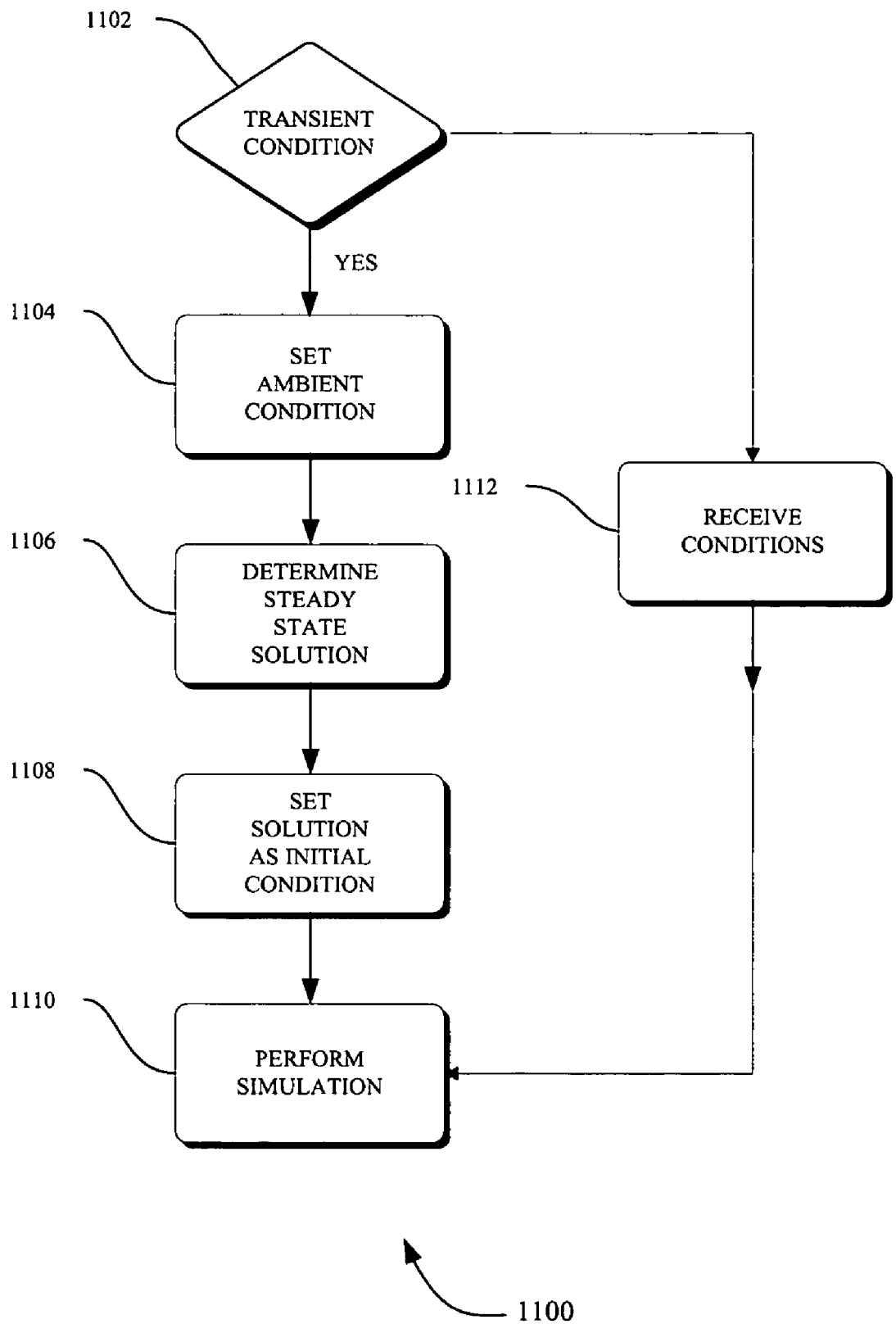
FIG. 11 is a flowchart of a method for transient fluid simulation performed by a client according to an embodiment; and, FIG. 12 is a flow diagram of the simultaneous adjustment with successive substitution (SASS) scheme for use in an implementation.

Referring to FIG. 11, a particular implementation 1100 for fluid network simulation is described in conjunction with the system overview in FIG. 2 and the data object components described in FIGS. 9 and 10. The figures use the Unified Modeling Language (UML), which is the industry-standard language to specify, visualize, construct, and document the object-oriented artifacts of software systems. Composition defines the attributes of an instance of a class as containing an instance of one or more existing instances of other classes in which the composing object does not inherit from the object(s) that forms its composition.

Components of the data objects such as 810, 914, and 1002 can be embodied as computer hardware circuitry or as a computer-readable program, or a combination of both in apparatus 200. These components can be received through remote computer 228, mass storage 210, communication channel 216, or by other suitable means for exchanging data or instructions from external sources.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or inter-process communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 202 in FIG. 2, or on at least as many computers as there are components.

FIG. 11 begins with action 1102 by determining if the user of the fluid network simulation has set a transient condition. Transients arise in a fluid network by conditions such as changes in valve settings, condensation, perturbations caused by waves or by components of the fluid network, or by an action that causes a disruption of the steady state condition. Action 1102 ascertains a desire to model fluid transients by the user. When not modeling transients control passes to action 1112 for further processing. When modeling transients the variable time step (TSTEP), variable boundary condition (BNDUSER), and heat transfer (TRANSQ) subroutines are activated and can be used by all data objects for transient modeling. The TRANSQ subroutines identifies and supplies data for all nodes that are subjected to transient heat to the simulation system The BNDUSER modules accounts for the variable geometry and moving boundaries having an impact on the energy equation that describe the fluid network. Control passes to action 1104 for further processing. These relationships can be found in U.S. patent application Ser. No. 09/313,576, filed May 7, 1999, now U.S. Pat. No. 6,748,349, which is hereby incorporated by reference.

In action 1104, ambient conditions are set for the simulation. The ambient conditions set by the user pertain to the pressure, temperature, fluid, or other conditions relevant to the simulation. Once the ambient condition has been set control passes to action 1106 for further processing.

In action 1106, the steady state solution is determined. The steady state solution is determined by running the simulation without the transient conditions. After steady state simulation of the fluid network has been completed control passes to 1108 for further processing.

In action 1108, the results of the steady state simulation are made initial conditions for transient simulation. Control then passes to action 1110 for further processing. The simulation in action 1110 is performed on the basis of the choice made in action 1102. For a transient condition the critical output for the simulation depends on the cause of the transient condition. For example, in rapid valve closing the critical outputs are maximum pressure and frequency of oscillation, while for rapid valve opening maximum pressure and time to reach steady state is a critical output. The simulation is continued for a series of time steps until the numerical method converges to a solution. The time step chosen for the simulation should adhere to a courant number of less than unity. The courant number is proportional to the length of the branches and inversely proportional to the product of speed of sound and the chosen time step. Further, the speed of sound plays an important role especially when modeling different fluids in the network since the sound speed is a function of the fluid. However, assuming similar fluids the time step is proportional to the length of the branches in the network.

Figure 12:
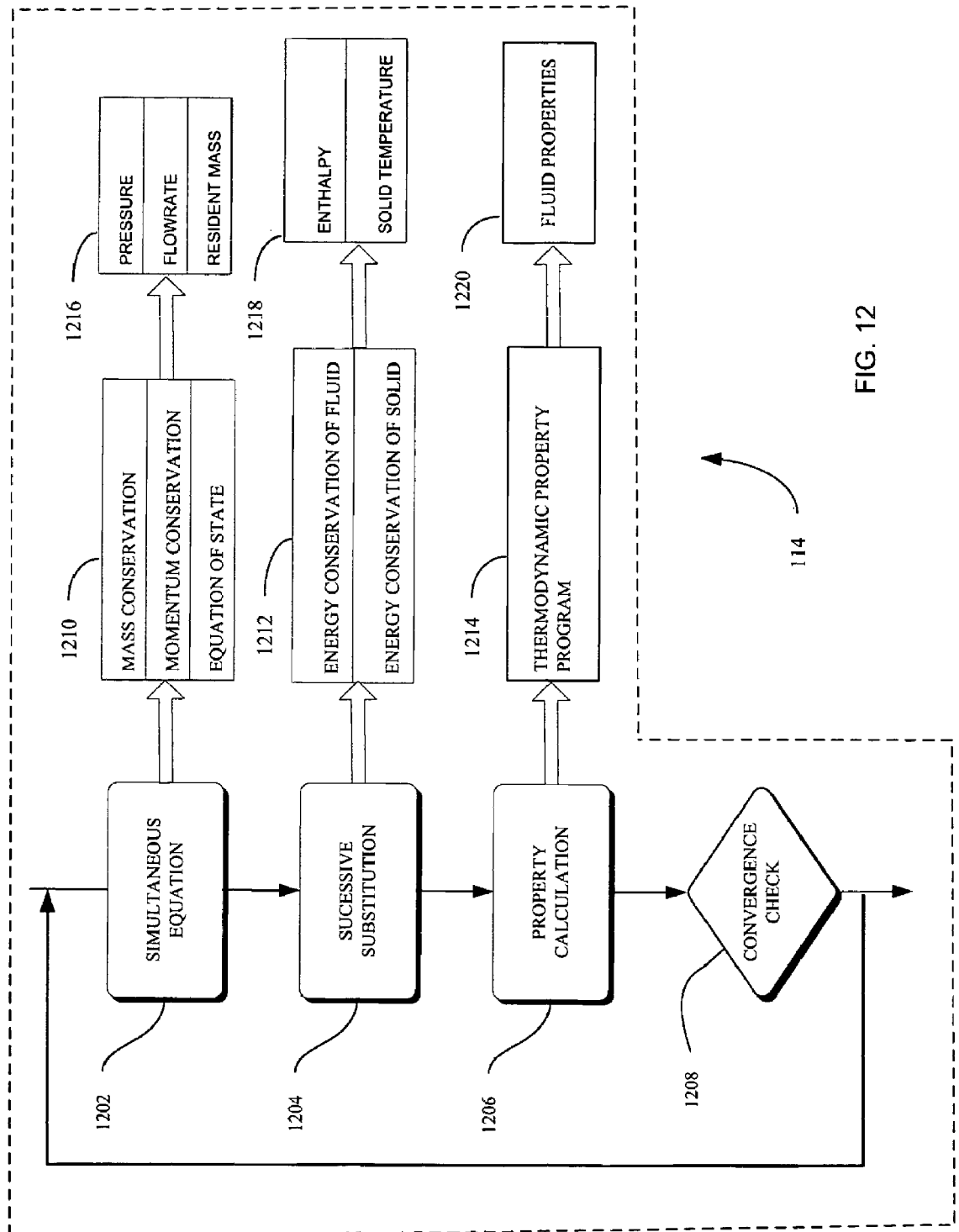

FIG. 12 is a flow diagram of the Simultaneous Adjustment with Successive Substitution ("SASS") scheme that forms part of solver 112 for fluid network simulation. The solver 112 can be used to simulate phase changes, compressibility, mixture thermodynamics, external body forces, fluid transient, waterhammer conditions, prediction of unsteady pressure, flowrate distribution, and conjugate heat transfer in a fluid network. Solver 112 meets the need in the art for easier way to generate a simulation of a fluid network. There are three distinct groups that makeup the SASS scheme: (a) the iteration loop, (b) the governing equations, and (c) variables. The first element of the iteration loop (1202-1208) is the set of simultaneous equations that mathematically describe the property of the fluid, the initial conditions on the fluid network, geometrical relationship of the elements in the fluid network, and other relationships that may affect the fluid or the network. The generating equations for the simultaneous equation should adhere to the principles of conservation of mass, conservation of momentum, and equation of state (1210) and can be expressed in terms of pressure, flow rate between two or more points, and resident mass (1216). The conservation of mass requires an accounting of the mass entering and exiting two arbitrary points in the fluid network. At steady state, the change in mass at these two arbitrary points is zero such that the total mass into and total mass out of are equal to one another. The conservation of momentum expresses the combination of unsteady and inertia terms equal to a combination the friction force and the pressure force of the fluid in the network. The unsteady term represents rate of change of momentum with time. For steady state flow, time step is set to an arbitrary large value and this term is reduced to zero. The inertia term is important when there is a significant change in velocity in the longitudinal direction due to change in area and density. An upwind differencing scheme is used to compute the velocity differential. The pressure term represents the pressure gradient in the branch. The pressures are located at the upstream and downstream face of a branch. The equation of state for a given pressure, enthalpy, temperature, and compressibility of the fluid in the network is proportional to resident mass.

Proceeding through the loop, the simultaneous equation of group 1202 is combined in such way through successive substitution 1204 by exploring energy conservation for both fluids and solids. The energy conservation of a fluid can be expressed as a function of enthalpy following the first law of thermodynamics. The energy conservation of a solid can be expressed by realizing that the change in temperature of a solid at a node is proportional to the heat transfer from the neighboring node and heat source or sink. Mathematically this can be expressed by the following equation when there is a connection between a solid node, fluid node, and ambient node:

$$T_s^i = \frac{\sum_{js=1}^{n_{ss}} C_{ij_s} T_s^{js} + \sum_{jf=1}^{n_{sf}} C_{ij_f} T_f^{jf} + \sum_{ja=1}^{n_{sa}} C_{ij_a} T_a^{ja} + \frac{(mC_p)_m}{\Delta \tau} T_{s,m}^i + \dot{S}}{\frac{mC_p}{\Delta \tau} + \sum_{js=1}^{n_{ss}} C_{ij_s} + \sum_{jf=1}^{n_{sf}} C_{ij_f} + \sum_{ja=1}^{n_{sa}} C_{ij_a}}$$

Where T is the temperature at nodes i and j for solid, fluid, and ambient node; C is the conductance at nodes i and j for solid, fluid, and ambient node; and, where the other variables are from well known general equations of fluids and thermodynamics.

Once the simultaneous equations have been identified and the relationships by successive substitution have been explored the solver is ready to determine the property calculation 1206 of the fluid network. The pressure, enthalpy, and resident mass in internal nodes and flow rate in branches are calculated by solving equations for mass conservation, momentum conservation, energy conservation, and equation of state. The temperature of the solid node was calculated from equation above for $T^i$ solid. A combination of the Newton-Raphson method and the successive substitution method is then used to solve the set of equations. The mass conservation, momentum conservation and resident mass equations are solved by the Newton-Raphson method. The energy conservation equations for fluid and solid are solved by the successive substitution method. The temperature, density and viscosity are computed from pressure and enthalpy using a thermodynamic property program well known to those in the art. For references to these equations and for thermodynamic property programs see the publication of Alok Majumdar, "Numerical Modeling of Conjugate Heat Transfer in Fluid Network"; Thermal Fluid Analysis Workshop; Aug. 30-Sep. 3, 2004, Jet Propulsion Laboratory, Pasadena, Calif., and U.S. Pat. No. 6,748,349

The final part of the loop is decision block 1208 which restarts the iteration loop, with the current solutions as the initial conditions, until there is a satisfaction of the conditional statement. In the SASS scheme, the iterative loop will continue until the normalized maximum correction is less than a convergence criterion. At a convergence criterion set to 1 per thousand (0.001) has been shown to be more than adequate for simulations of a fluid network. Once the convergence criterion has been set the solver returns the value of the simulation to the calling module or output data file for presentation to the user in accordance to the desired out vehicle or format.

CONCLUSION

A method and apparatus has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in object-oriented terms, one of ordinary skill in the art will appreciate that implementations can be made in a procedural design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application with respect to data objects is meant to include all object-oriented languages, database systems and communication environments and alternate technologies that provide the same functionality as described herein.

I claim:

1. A computer method for simulating a fluid network via a graphical user interface, the method comprising:
   receiving one or more data objects representing the fluid network from a user through the graphical user interface, wherein the one or more data objects represent nodes, branches, and components of the fluid network;
   displaying a diagram panel within a user interface, the diagram panel including respective graphical representation of the data objects that describe the fluid network,
   selectively displaying a data object attribute panel within the user interface, the data object attribute panel being distinct from the diagram panel;
   selectively displaying a resistance data object attribute panel within the user interface, wherein the resistance data object represent flow resistance in the fluid network;
   receiving respective values for one or more data objects, the respective values input by a user through the data object attribute panel;
   performing a simulation based on the one or more data objects and respective values received through the data object attribute panel and the resistance data object attribute panel; and
   causing an output panel to display results of the performed simulation.

2. The computer method of claim 1, the method further comprising:
   associating the data objects with one or more data object type;
   wherein the data object type is one or more boundary node, internal node, branch node, fluid heat transfer, component, or user defined.

3. The computer method of claim 2, wherein the values for one or more data objects is one or more thermofluid properties, geometric properties, relational properties, quantitative properties, boundary condition, initial condition, discretization, or momentum data.

4. The computer method of claim 3, wherein thermofluid properties can be selected from one or more pressure, temperature, density, concentration, enthalpy, entropy, gas constant, specific heat ratio, conductivity, viscosity, or pressure.

5. The computer method of claim 4, wherein the values for one or more data objects can be one or more measured signal, derived signal from measured parameters, or user supplied signal.

6. The computer method of claim 5, wherein the simulation analyzes steady state and transient flow in a complex fluid network to produce results that model one or more phase changes, compressibility, mixture thermodynamics, external body forces, fluid transient, waterhammer conditions, prediction of unsteady pressure, flowrate distribution, or conjugate heat transfer.

7. A computer-accessible medium having executable instructions for simulating a fluid network, the executable instructions capable of directing a processor to perform:
   receiving one or more data objects representing the fluid network from a user through a graphical user interface, wherein the one or more data objects represent nodes, branches, and components of the fluid network;
   displaying a diagram panel within a user interface, the diagram panel including respective graphical representation of the data objects that describe the fluid network,
   selectively displaying a data object attribute panel within the user interface, the data object attribute panel being distinct from the diagram panel;
   selectively displaying a resistance data object attribute panel within the user interface, wherein the resistance data object represent flow resistance in the fluid network;
   receiving respective values for one or more data objects, the respective values being inputted by a user through the data object attribute panel;
   performing a simulation based on the one or more data objects and the respective values received through the data object attribute panel and the resistance data object attribute panel; and
   causing an output panel to display results of the performed simulation.

8. The computer-accessible medium of claim 7, the medium further comprising executable instructions capable of directing a processor to perform:
   associating the data objects with one or more data object type;
   wherein the data object type is one or more boundary node, internal node, branch node, fluid heat transfer, or component.

9. The computer-accessible medium of claim 8, wherein the values for one or more data objects is one or more thermofluid properties, geometric properties, relational properties, quantitative properties, boundary condition, initial condition, discretization, or momentum data;
   wherein thermofluid properties can be selected from one or more of temperature, density, concentration, enthalpy, entropy, gas constant, specific heat ratio, conductivity, viscosity, or pressure;
   wherein the values for one or more data objects can be one or more measured signal, derived signal from measured parameters, or user supplied signal.

10. A computer system for simulating a fluid network comprising:
a processor;
a storage device coupled to the processor; and
software means operative on the processor for:
(i) receiving one or more data objects representing the fluid network from a user through a graphical user interface, wherein the one or more data objects represent nodes, branches, and components of the fluid network;
(ii) causing a diagram panel to display a graphical representation of the data objects that describe the fluid network,
(iii) selectively displaying a data object attribute panel within the user interface, the data object attribute panel being distinct from the diagram panel;
(iv) selectively displaying a resistance data object attribute panel within the user interface, wherein the resistance data object represent flow resistance in the fluid network;
(v) receiving respective values for one or more data objects, the respective values being inputted by a user through the data object attribute panel;
(vi) performing a simulation based on the one or more data objects and the respective values received through the data object attribute panel and the resistance data object attribute panel; and
(vii) causing an output panel to display results of the performed simulation.

11. The computer system of claim 10, wherein the software means further
associates the data objects with a select one or more data object type;
wherein the data object type is one or more boundary node, internal node, branch node, fluid heat transfer, or component.

12. The computer system of claim 11, wherein the values for one or more data objects is one or more thermofluid properties, geometric properties, relational properties, quantitative properties, boundary condition, initial condition, discretization, or momentum data.

13. The computer system of claim 12, wherein thermofluid properties can be selected from one or more pressure, temperature, density, concentration, enthalpy, entropy, gas constant, specific heat ratio, conductivity, viscosity, or pressure.

14. The computer system of claim 13, wherein the values for one or more data objects can be one or more measured signal, derived signal from measured parameters, or user supplied signal.

15. A computer method for simulating a fluid network via a graphical user interface, the method comprising:
receiving boundary node objects that represent one or more elements of the fluid network from a user through a graphical user interface;
receiving internal node objects that represents one or more elements of the fluid network from a user through a graphical user interface;
receiving branch node objects that represent one or more elements of the fluid network from a user through a graphical user interface;
receiving fluid heat transfer objects that represent one or more elements of the fluid network from a user through a graphical user interface;
receiving component objects that represent one or more elements of the fluid network from a user through a graphical user interface;
causing a diagram panel to display a graphical representation of the received data objects that represent the one or more elements of the fluid network,
receiving values for one or more of the received data objects from a user through a data object attribute panel, the attribute panel being distinct from the diagram panel;
performing a simulation based on the one or more of the received data objects and the values received through the data object attribute panel; and
causing an output panel to display results of the performed simulation.

16. A computer method for simulating a fluid network, the method comprising:
receiving a model of the fluid network from a user through a graphical user interface, wherein the model is one or more data objects that represent nodes, branches, and components of the fluid network;
receiving fluid heat transfer objects that represent one or more elements of the fluid network from a user through a user interface;
selectively displaying a resistance data object attribute panel within the graphical user interface, wherein the resistance data object represent flow resistance in the fluid network;
processing the received model, received heat transfer objects, and any selected resistance data object to determine a simultaneous solution to one or more representation of fluid, solid, or nodes;
processing the simultaneous solution to determine successive substitution of the one or more representation of fluid, solid, or nodes;
processing the simultaneous solution and successive substitution to determine the property of the one or more representation of fluid, solid, or nodes;
repeating the processing to determine a simultaneous solution, processing to determine successive substitution, and processing to determine the property of the one or more representation of fluid, solid, or nodes until a predetermined convergence criterion is satisfied; and
controlling the computer to display in an output panel the determined property that satisfied convergence criterion.

17. The method of claim 16, wherein the determined simultaneous solution is one or more mass conservation, momentum conservation, or equation of state.

18. The method of claim 17, wherein the mass conservation is defined by the pressure of one or more solid, or fluid;
wherein the momentum conservation is defined by the flowrate of the fluid;
wherein the equation of state is defined by the resident mass of one or more fluid, or solid.

19. The method of claim 18, wherein the successive substitution is one or more energy conservation of fluid, or energy conservation of solid.

20. The method of claim 19, wherein the energy conservation of fluid is defined by the enthalpy and thermodynamic properties of one or more fluid, or solid.

21. The method of claim 20, wherein the energy conservation of solid is defined by the temperature of solid, fluid, or ambient node.

22. The method of claim 21, wherein the convergence criterion is where the difference between correction of a current iteration and a prior iteration is less than and arbitrary value set by the user.

23. The method of claim 22, wherein controlling the computer is automatically selecting one or more output display panel, printer, or charting package.

* * * * *